Feb. 10, 1925.

J. T. LITTLETON 1,525,453

PROCESS OF MAKING SPARK PLUGS

Filed April 25, 1921    6 Sheets-Sheet 1

INVENTOR
Jesse T. Littleton
BY
ATTORNEY

Feb. 10, 1925.

J. T. LITTLETON 1,525,453

PROCESS OF MAKING SPARK PLUGS

Filed April 25, 1921   6 Sheets-Sheet 5

INVENTOR
Jesse T. Littleton
BY
ATTORNEY

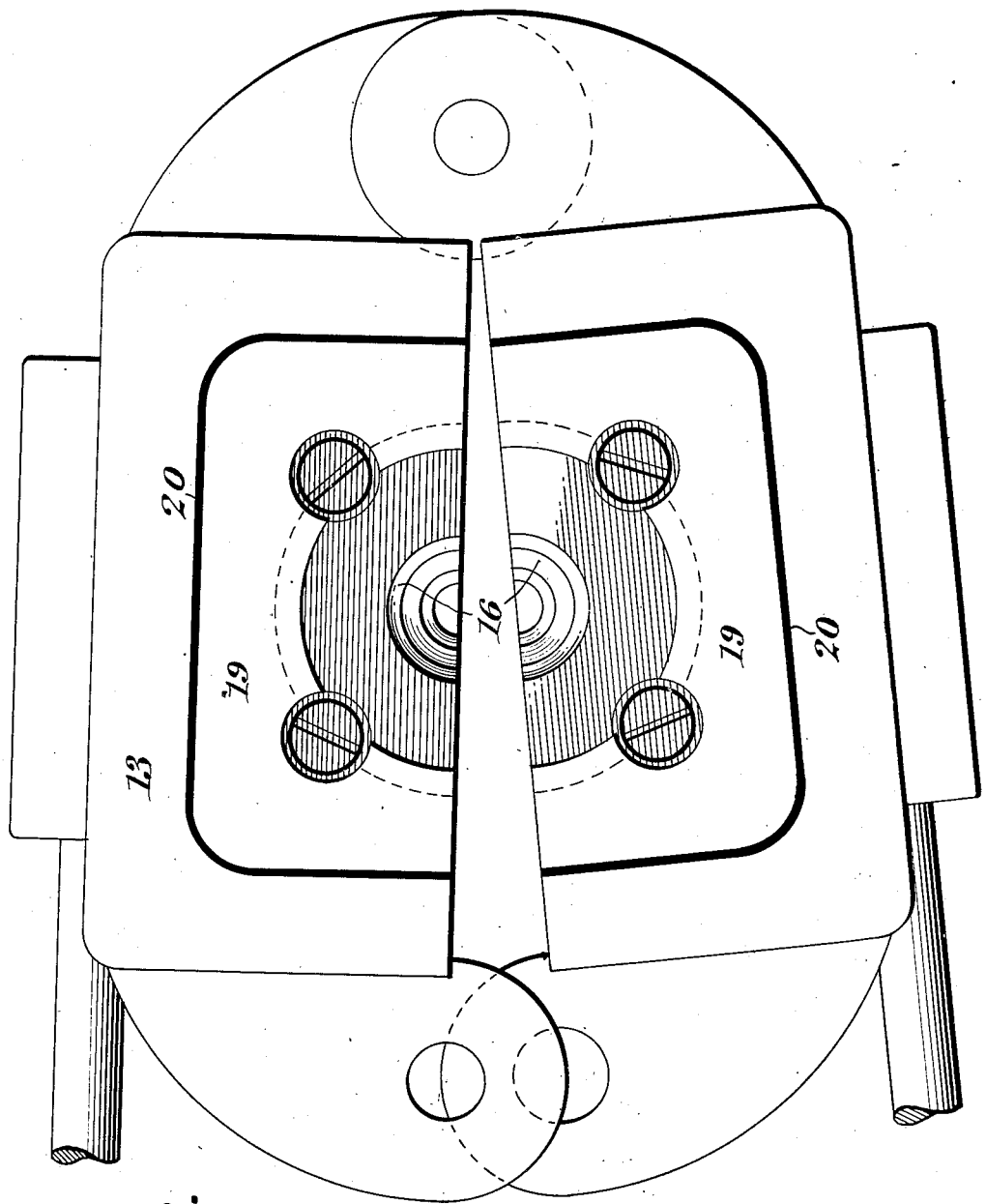

Patented Feb. 10, 1925.

1,525,453

UNITED STATES PATENT OFFICE.

JESSE T. LITTLETON, OF CORNING, NEW YORK, ASSIGNOR TO CORNING GLASS WORKS, OF CORNING, NEW YORK, A CORPORATION OF NEW YORK.

PROCESS OF MAKING SPARK PLUGS.

Application filed April 25, 1921. Serial No. 464,143.

*To all whom it may concern:*

Be it known that I, JESSE T. LITTLETON, a citizen of the United States of America, and a resident of Corning, New York, have invented certain new and useful Improvements in Processes of Making Spark Plugs, of which the following is a specification.

This invention relates to a new and useful construction of spark plugs for explosive engines, and to the process of making the same, the object had in view, being the construction of a plug, in which glass used as the material of the insulating core, is formed and shaped around the central electrode. In spark plugs of this type, it is important to provide for a tight seat between the metallic and glass parts, which will not open up under the pressures, and variations of temperature to which the parts are subjected in use, and which will not cause, under the same conditions, strains sufficient to break the glass core. In addition to the above the plug must possess high mechanical and electrical strength, and heat resisting properties.

The nature of the problem which is to be solved, will be rendered plainer by a consideration of the following facts.

The thermal endurance of the glass of the core must be low. In preference a glass whose linear coefficient of expansion is as low as .0000033 per degree C. is employed.

Metals such as commonly used for heating have a linear coefficient of expansion as high as .000012.

The sparking point of the central electrode, and the heating near its top, may reach in use, a temperature as high as 500°–800° C.

The compression within the engine, and thus the pressure tending to cause leakage through the plug, may run as high as 720 lbs. to the square inch.

These temperatures and pressures render it necessary to avoid the use of fusible cements and glazes in uniting glass and metallic parts, and to so dispose the parts that strains due to heating and cooling are avoided as much as possible, or so located and directed that their harmful effect is counteracted or reduced.

This invention further consists in the several features hereinafter pointed out and claimed.

Referring to the accompanying drawings:—

Fig. 8, is an inverted view of the upper portion of the mold, the parts thereof being separated slightly;

Figure 1:
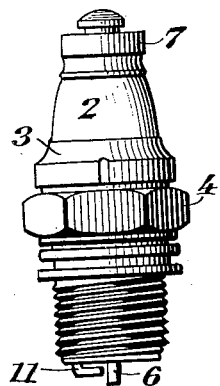
Figure 1, is a side elevation of one form of spark plug embodying this invention.
Figure 2:
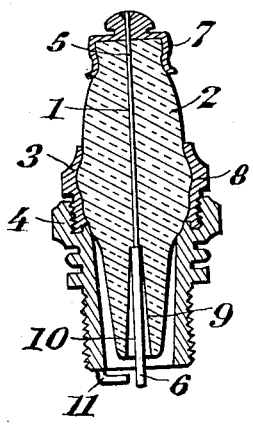
Fig. 2, is a vertical section therethrough.
Figure 3:
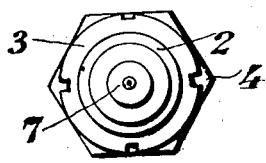
Fig. 3, is a plan view thereof.
Figure 4:
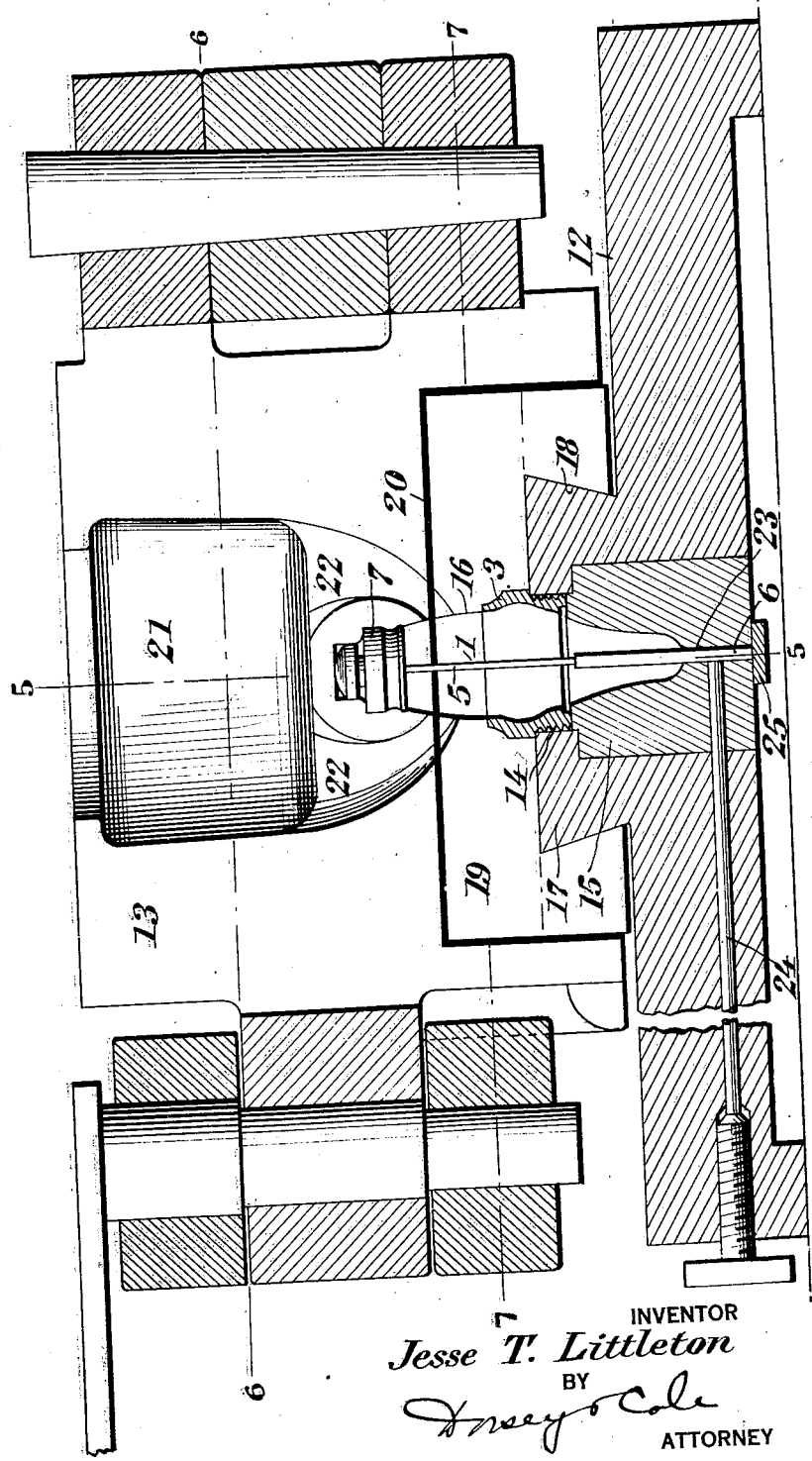
Fig. 4, is a vertical section through a mold adapted for use in the manufacture of the plug shown in Figs. 1, 2, and 3, the parts being shown assembled and ready for the introduction of a charge of molten glass, the mold plunger being omitted.
Figure 5:
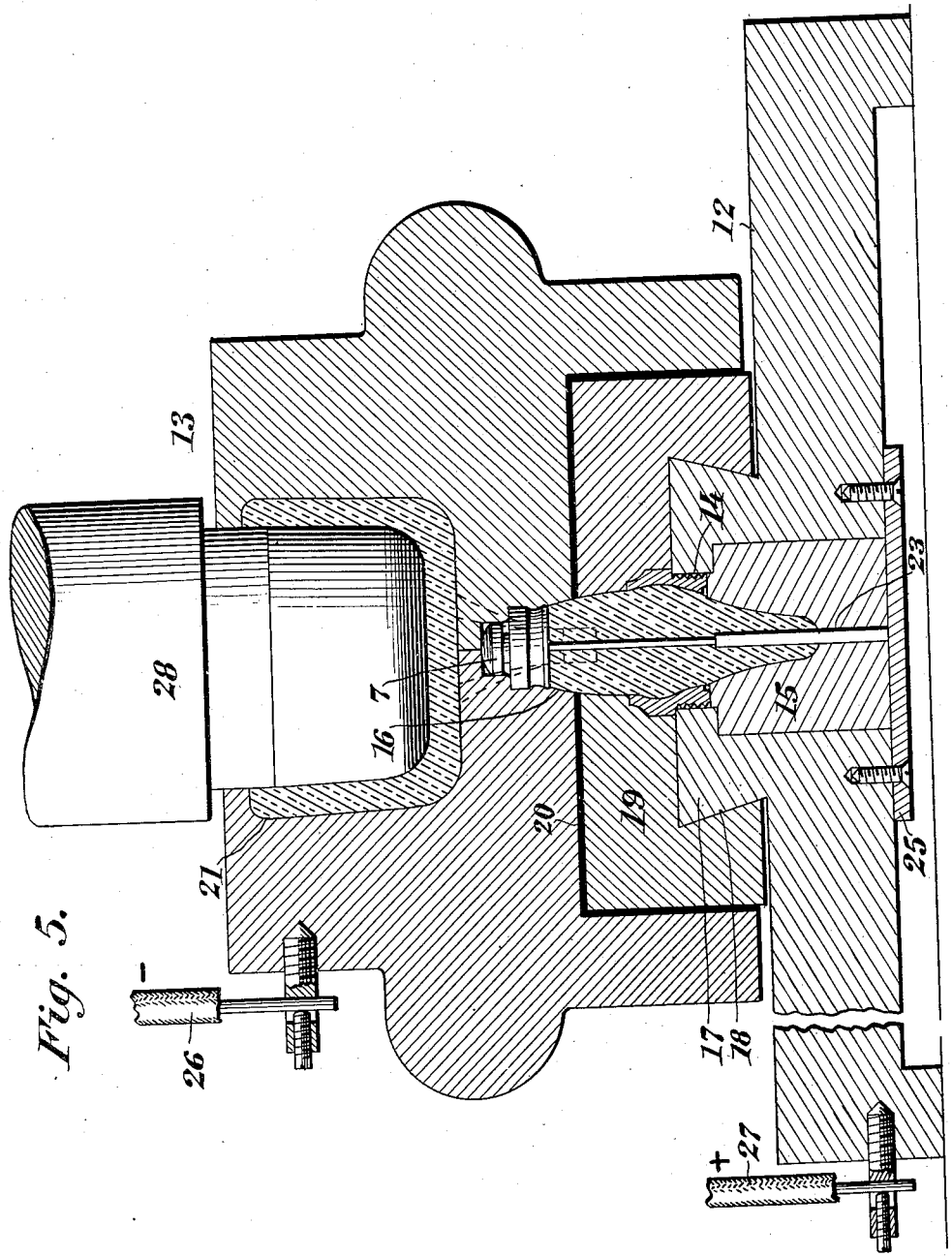
Fig. 5, is a vertical section taken on the line 5—5 of Fig. 4, showing the glass pressed in the mold cavity.
Figure 6:
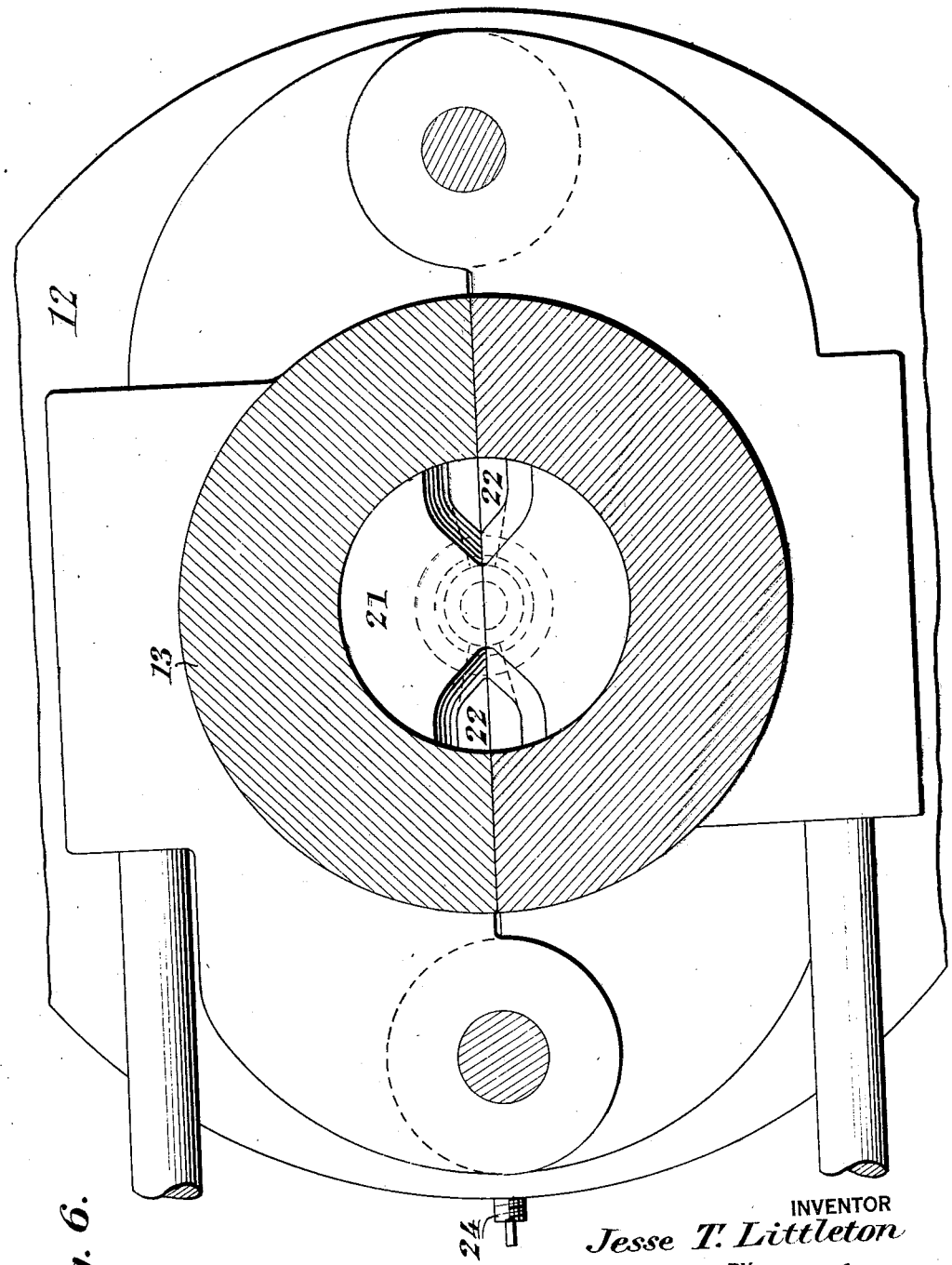
Fig. 6, is a horizontal section through the upper portion of the mold, taken on the line 6—6 of Fig. 4.
Figure 7:
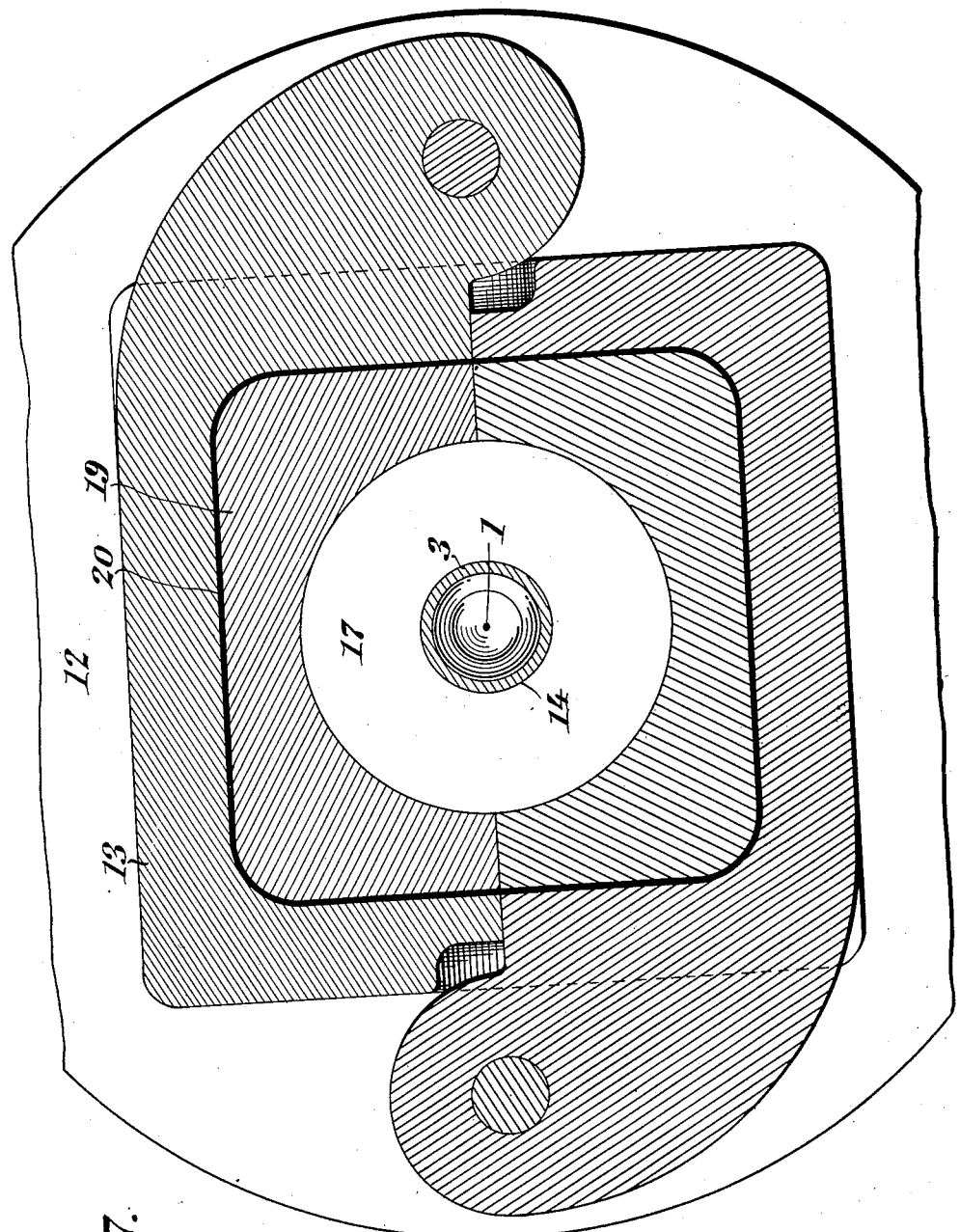
Fig. 7, is a horizontal section taken on the line 7—7 of Fig. 4.

As shown in Figures 1, 2 and 3, the improved spark plug forming the subject-matter of this application comprises a central electrode 1, a core 2, of glass molded around the electrode and inside of a metallic band 3, and a shell member 4, in which the band is screwed, and which is adapted to be screwed into the engine cylinder.

The electrode 1, consists of an upper portion 5, of relatively small diameter, which is preferably formed of some low expansion metal that can be sealed in the glass of which the core 2 is made. Molybdenum or tungsten are suitable for this part. However, as these metals break down when used as spark points, the lower portion 6 of the electrode is preferably made enlarged in cross section, and of some metal which stands up under the conditions to which the spark points are subjected. The nickel-manganese alloys now in common use are suitable for this part of the electrode; the two parts of the electrode being welded, or otherwise firmly secured together. A wiring terminal, in the form of a cap 7, is shown as firmly fastened to the upper end of the electrode portion 5.

The core 2, is, by preference, formed of the glass designated as $B_2$, in U. S. patent to Sullivan and Taylor, No. 1,304,623, of May 27, 1919, having a linear coefficient of expansion of about .0000033 per degree C. As will be hereinafter described the glass is molded into form around the central electrode, and within the cap 7, and also within the band 3, which surrounds its central portion, the interior of the band having rounded annular corrugations 8 therein to anchor the glass within the band. The external contour of the core may closely approach, or be identical with standard practice, including the conical sleeve 9 at the tip whereby a free space is left around the tip and inside of the bushing. An expansion space 10 is formed within the sleeve, around the nickel manganese alloy sparking point 6 of the central electrode to prevent the cracking of the core 2 by the expansion of the point, which is considerable, under the high temperatures present in use, as such alloys have relatively high expansion. This space at this point is of greater importance, due to the fact that the tapered form of the sleeve 9 (which is desirable to prevent the deposit of carbon and short-circuiting) reduces the resistance of the core to fracture from tensile strain. For this reason, the space 10 should extend back into the core for a considerable distance and preferably to the joint between the two sections of the electrode. The variations of temperature at such a point are not as extensive as at the tip, and the strength of the core (due to its greater cross section) is greater. The junction between the two sections of the central electrode should also be sufficiently removed from the tip of the plug not to melt from the heat of the engine.

The shell 4 may be of any approved construction, and be provided with any approved form of sparking point 11.

The spark plug per se is claimed in my application, Serial No. 621,767, filed Feb. 28, 1923.

In the manufacture of a plug such as described, a mold structure, such as shown in the drawings is, by preference used. This structure comprises a base portion 12, and a top portion 13, that is made of separable, and preferably, of hinged halves. The base 12 has in its upper face a recess 14 forming the lower part of the mold cavity. The upper end of this cavity has a diameter sufficient to receive the lower half of the band 3, a shoulder being formed in the recess 14, immediately below such enlarged diameter, to form a seat for the band. In practice, a block 15 may be inserted in the base 12, and the center of this block is recessed with a contour to form the tip portion of the core.

The hinged halves forming the top portion 13 of the mold are similarly formed, and they each have a central recess 16 registering, when the mold parts are assembled, with the recess 14 in the base. The recess 16 is large enough at its bottom end to take in the upper half of the band 3, the upper portion thereof being of the general contour desired for the core above the band.

In order to hold the top portion 13 of the mold in place on the base, the upper surface of the base surrounding the recess 14 therein, is formed into a boss 17, having undercut walls 18, and the top portion 13 has a similarly shaped recess formed in its bottom, and when the two halves of the top portion 13 are assembled together on the base, and locked against separation, the top portion will be firmly anchored on the base.

The halves of the top portion of the mold are shown as provided with pieces in the form of rectangular blocks 19, that are inserted therein, being held in place by means of screws (see Fig. 8). A layer of insulating material 20, such as mica, is interposed between the contacting surfaces of the blocks and the body of the top portion of the mold. In the blocks 19 is preferably formed the central recess 16, for receiving the upper half of the band 3, and also the lower part of the portion of the cavity forming the core above the band 3. The cavity is extended upwardly above the blocks 19, and its upper portion is adapted to receive and support the cap 7 on the upper end of the electrode.

A font cavity 21 is formed in the upper part of the top portion of the mold, and this cavity communicates by sprue passages 22 with the core cavity, entering the same below the space occupied by the cap 7. In the drawings, these passages are shown as formed in part in the blocks 19.

The construction of the top portion of the mold is such, that when the hinged halves thereof are assembled on the base, with the metal parts of the spark plug core positioned in the mold cavity, the part of the mold in which is placed the cap 7, will be separated by the insulation 20, from the part thereof in which the band 3 is placed, the band being supported by the recess 14 in the base 12 and the recess 16 formed in the blocks 19 of the top portion of the mold.

The base portion 12 of the mold, below the recess 14 therein, is bored axially of the mold cavity, as at 23, and also bored radially thereto. In the latter bore is contained a clamping screw 24.

Figure 9:
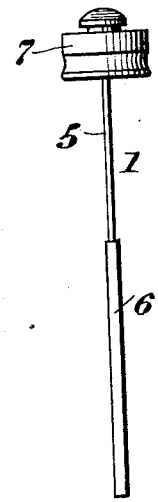
Fig. 9, is a detail view in elevation of the central electrode and cap.

In forming the core, the electrode with the cap 7 fastened thereon (see Fig. 9) has its lower end inserted in the vertical bore 23 of the base 12, a plate 25 on the bottom of the base serving to properly position it, and is clamped in place by the screw 24. The band 3 is sliped over the upper exeremity of the electrode and inserted in the enlarged upper end of the recess 14 in the base 12. The halves of the top portion 13 are then closed around the boss 17 of the base 12.

The electrode (which has the lower section 6 thereof made somewhat longer than necessary) now has its lower end firmly held in the base portion of the mold, and its upper end in the top portion. If the base and top portions of the mold are now included as a part of an electrical circuit, fed from a proper source of energy, by means of wires 26 and 27, that are respectively attached to the top and base, current will flow through the central electrode 1, the insulating layer 20 restraining it to this path. The current should be of sufficient volume to heat to incandescence the electrode, whereby gases occluded therein will be driven off.

After this action has taken place, and while the electrode is still hot, glass which has been placed in the front cavity 21 in any proper way, is forced by the action of a plunger 28 to flow through the sprue passages into the mold cavity formed by the recesses in the top and base portions of the mold. In doing this, it flows up into the cap 7, and around the electrode, and within the band 3, to which it unites itself by a joint in the nature of a weld.

As the occluded gases have been drawn out of the electrode, it will be found that the joint between the electrode and the glass is good, and free of air bubbles which would otherwise be present and tend to leakage.

Figure 10:
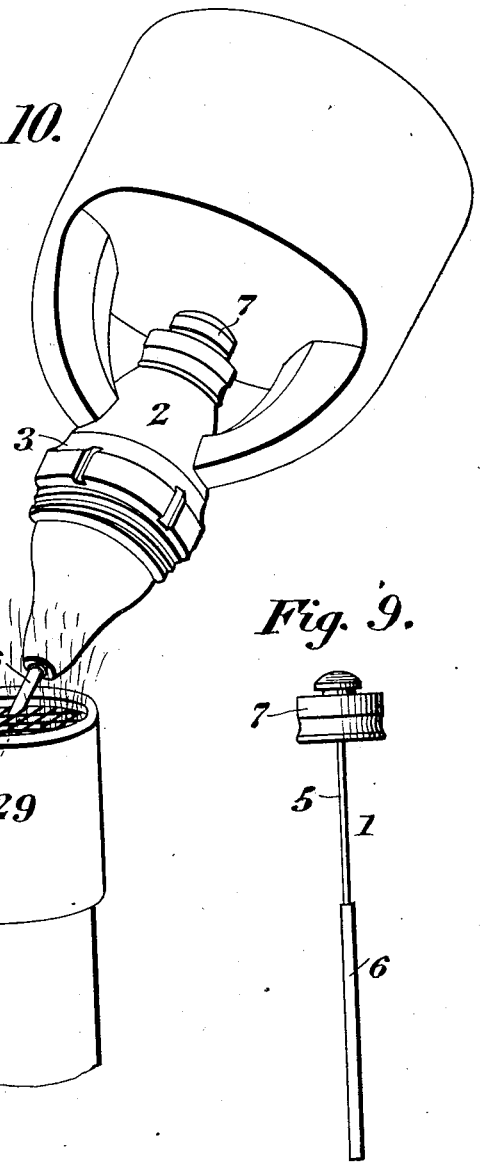
Fig. 10, is a view illustrating the method of forming an expansion chamber in the end of the insulating core around the electrode.

The glass having set, the mold is opened and the glass with its surrounding band and the enclosed electrode taken out by means of pliers or other suitable tool and the expansion space 10 then formed in the tip of the core while the glass is still hot. One method of forming the space 10 is illustrated by Fig. 10 of the drawings, wherein I have shown the tip of the core being heated in a Meeker gas burner 29, the portion of the electrode extending beyond the tip being inserted in the burner gauze.

When the glass forming the tip is sufficiently hot, the body of the core is worked laterally to work the softened glass away from the electrode which is held from such movement by the burner gauze. This motion should preferably be of such character that the expansion space so formed, will extend as far back as the inner end of the tip section 6 of the electrode, so that strain will not be put on the core by the expansion of such section. The heating of the tip of the core also results in fire-polishing the glass at that point. This fire-polishing has been in itself of value in reducing the tendency of the spark plug to soot.

The sprues and excess glass in the font cavity are removed by breaking them off and grinding, and the core can now be assembled in the shell 4. In plugs having short cores, such as the type illustrated, it will be necessary to remove the excess length of the lower portion 6 of the electrode so that its sparking point can be adjusted to the sparking point 11 of the shell.

Having thus described the nature of this invention, what is claimed is:—

1. The hereinbefore described method of making a spark plug which comprises the steps of molding a glass core around an electrode, and forming an expansion space around the lower end of the electrode by relatively moving such end of the electrode and the core while the glass forming the lower end of the core is plastic.

2. The hereinbefore described method of making a spark plug which comprises the steps of molding a glass core around an electrode, reheating the tip of the core to render it plastic, and imparting relative lateral movement to the core and tip while the glass is plastic.

3. The hereinbefore described method of making a spark plug, which comprises the steps of heating an electrode, pressing molten glass around said heated electrode and fire polishing the tip of the core, and causing relative movement of the electrode and core during the fire polishing to form a space between the electrode tip and fire polished core tip.

In testimony whereof, I hereunto sign my name this 19th day of April 1921.

J. T. LITTLETON.